Jan. 18, 1949.                    R. R. WYMORE                    2,459,731
                        AUTOMATIC TRACTOR AND IMPLEMENT HITCH
Filed Jan. 23, 1948                                              2 Sheets-Sheet 1

INVENTOR.
RALPH R. WYMORE,
BY
McMorrow, Berman & Davidson
ATTORNEYS.

Jan. 18, 1949.　　　　R. R. WYMORE　　　　2,459,731
AUTOMATIC TRACTOR AND IMPLEMENT HITCH

Filed Jan. 23, 1948　　　　　　　　　　　　　　2 Sheets-Sheet 2

INVENTOR.
RALPH R. WYMORE,
BY
*McMorrow, Berman, & Davidson*
ATTORNEYS

Patented Jan. 18, 1949

2,459,731

UNITED STATES PATENT OFFICE 2,459,731

AUTOMATIC TRACTOR AND IMPLEMENT HITCH

Ralph R. Wymore, Oberlin, Kans.

Application January 23, 1948, Serial No. 3,857

4 Claims. (Cl. 280—33.15)

This invention relates to tractor coupling devices and more particularly to a coupling device by means of which a trailer or farm implement may be easily and quickly coupled to a tractor or uncoupled therefrom with a minimum amount of physical effort and with reduced risk of bodily injury to the operator.

A main object of the invention is to provide a novel and improved tractor hitch device which is simple in construction, easy to manipulate and which does not require the implement or trailer which is to be connected to the tractor to be initially aligned with the tractor-carried portion of the device in order to make the required connection.

A further object of the invention is to provide an improved tractor hitch device which may be automatically driven by the power take-off shaft or by the engine of a tractor on which it is mounted, said device operating to securely connect an implement or trailer to the tractor, enabling the trailer or implement to be hitched to the tractor from awkward relative positions and requiring no manual operations close to the hitching jaws of the device, thereby minimizing hazards of injury to the operator.

Figure 1:
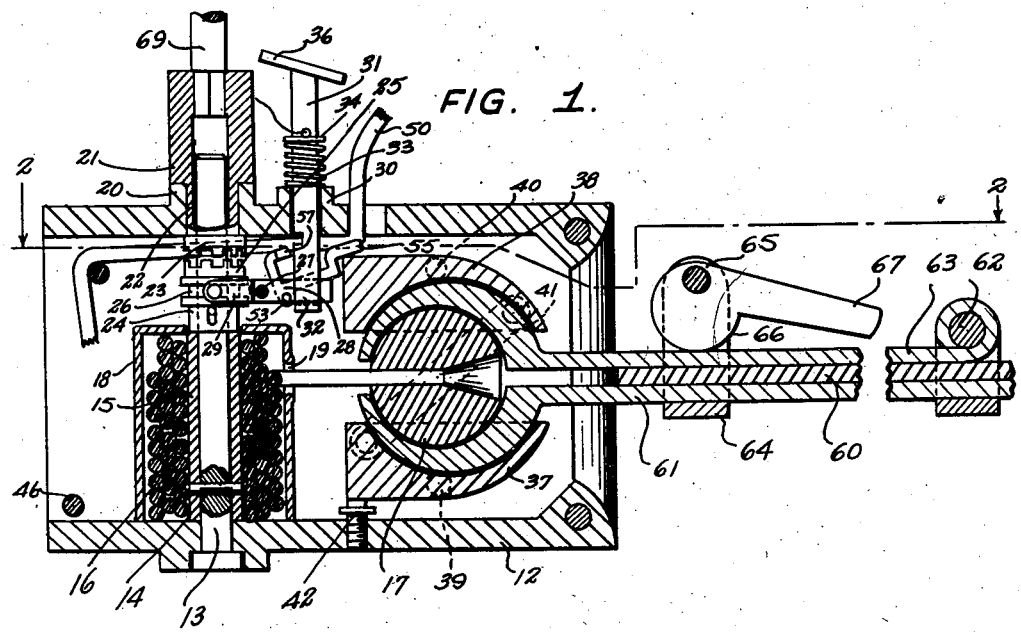
Figure 2:
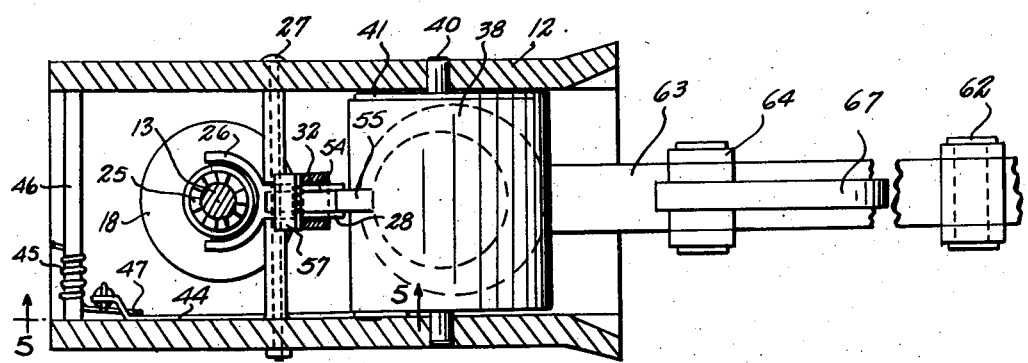
Figure 6:
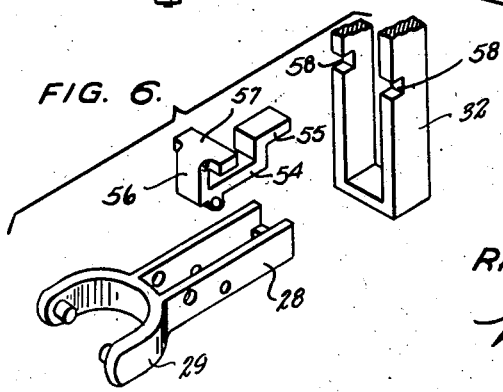
Figure 3:
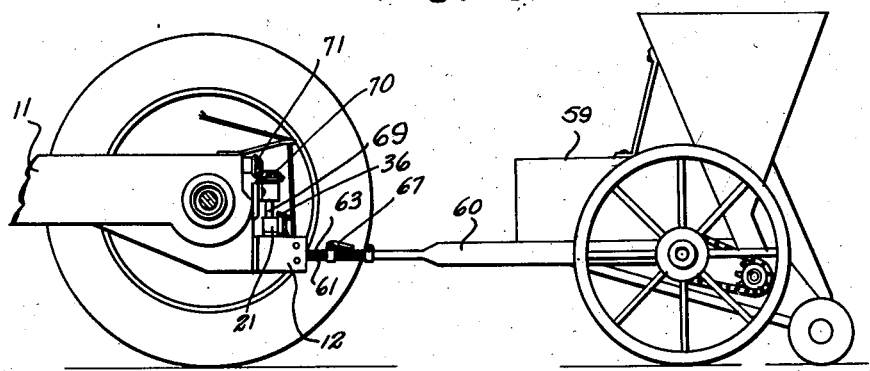
Figure 4:
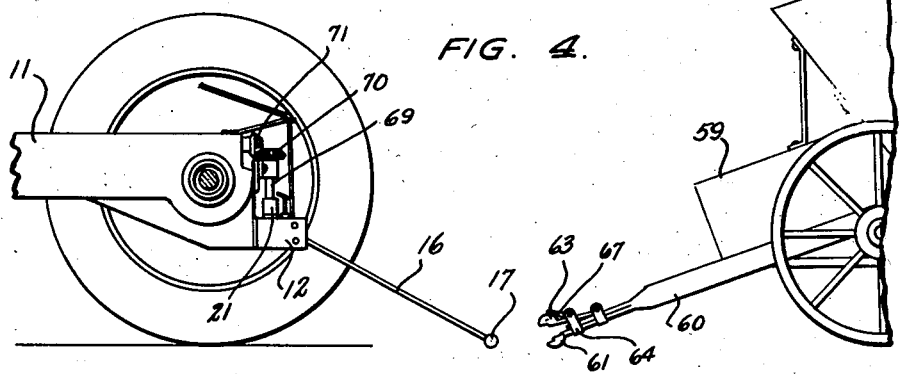
Figure 5:
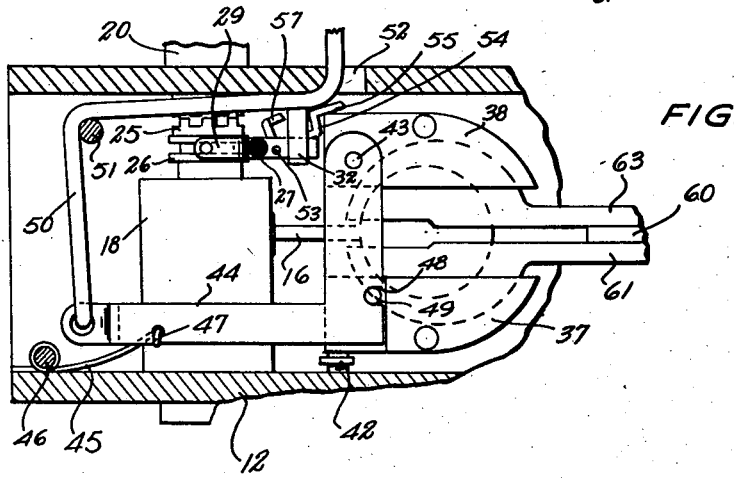

Further objects and advantages of the invention will become apparent from the following description and claims and from the accompanying drawings, wherein:

Figure 1 is a vertical longitudinal cross-sectional view taken through a tractor hitch device constructed in accordance with the present invention, Figure 2 is a horizontal cross-sectional view taken on line 2—2 of Figure 1, Figure 3 is an elevational view showing a farm implement connected to the rear portion of a tractor by means of the hitch device of Figures 1 and 2, Figure 4 is an elevational view showing the implement of Figure 3 disconnected from the tractor immediately prior to being connected thereto by means of the hitch device of Figures 1 and 2, Figure 5 is a cross-sectional view taken on line 5—5 of Figure 2, Figure 6 is a perspective detail view showing the windlass clutch yoke arm employed with the hitch device of Figures 1 and 2 together with its associated locking and trip members.

Referring to the drawings, 11 designates a tractor frame. Secured to the rear end of frame 11 is a generally rectangular housing 12 opening rearwardly thereof. Rotatably mounted in the forward portion of housing 12 is a vertical shaft 13 and secured on the lower portion of said shaft by means of a transverse pin 14 is a sleeve member 15. Secured at one end thereof to sleeve member 15 is a cable 16 which is wound on said sleeve member. Secured to the other end of said cable is a ball 17, the cable on sleeve member 15 being housed in a cylindrical cover 18 secured to the bottom wall of housing 12 and formed with an aperture 19 through which cable 16 passes. The top wall of housing 12 is formed with an annular bearing flange 20 and rotatably supported thereon and also rotatable on shaft 13 is a sleeve member 21 having a depending sleeve portion 22 extending downwardly through the top wall of housing 12. Sleeve 22 carries at its lower end a disc clutch plate 23. Keyed to shaft 13 below plate 23 but axially slidable on said shaft is a sleeve member 24 formed at its top end with a disc clutch plate 25 adapted to interlock with clutch plate 23 when sleeve member 24 is raised from its normal position shown in Figure 1. Sleeve member 24 is formed with an annularly grooved collar 26.

Transversely secured in housing 12 rearwardly adjacent collar 26 is a bearing bolt 27 and pivotally mounted thereon is a lever arm 28 formed at its forward end with a yoke 29 having inwardly extending projections loosely received in the annular groove of collar 26. When lever 28 is rotated clockwise, as viewed in Figure 1, sleeve member 24 is raised, causing clutch plate 25 to interlock with clutch plate 23, whereby torque may be transmitted from sleeve member 21 to sleeve member 15 through shaft 13.

Designated at 30 is an apertured boss located rearwardly adjacent annular bearing flange 20 on the top wall of housing 12 and vertically slidable in said boss 30 is a rod member 31. Rod member 31 is formed at its lower end to define a closed yoke 32 which receives the rear end of lever 28. Encircling the upper portion of rod member 31 and bearing on boss 30 is a coiled spring 33. The top end of spring 33 bears on a washer 34 encircling rod member 31 and held against upward movement thereon by a pin 35 extending through said rod member. Spring 33 biases rod member 31 upwardly so that normally yoke 32 holds lever 28 in the position shown in Figure 1. The top end of rod member 31 carries an inclined pedal pad 36.

Pivoted to the side walls of housing 12 in the rear lower portion thereof is a concave lower jaw 37 and in the rear upper thereof a concave upper jaw 38. Said jaws are pivoted for rotation around respective transverse axes shown at 39 and 40 in Figure 1. The rear portion of the top jaw 38 is connected to the forward portion of the bottom jaw 37 by a diagonal link arm 41 so that when top jaw 38 is swung counterclockwise, as viewed in Figure 1 to its open position, bottom jaw 37 is simultaneously swung clockwise to its open position. An adjustable stop screw 42 carried by the bottom wall of housing 12 cooperates with the forward end portion of lower jaw 37 to limit closing movement of the jaws.

Pivotally secured to the inner end portion of upper jaw 38 at 43 is an L-shaped arm 44. Arm 44 is resiliently secured to the bottom wall of housing 12 by a spring 45 encircling a bolt 46 transversely secured to the housing side walls adjacent its bottom wall, said spring bearing at one end against the housing bottom wall and being hooked through an opening in arm 44 at its other end, as shown at 47 in Figure 5. Spring 45 biases arm 44 is a counterclockwise direction with respect to pivot 43, as viewed in Figure 5. The arm 44 is formed at its upstanding portion with a notch 48 in which a lug 49 carried by lower jaw 37 is received, in the normal closed positions of the jaws illustrated in Figure 5. This locks the jaws in closed positions until arm 44 is rotated in a clockwise direction around its pivotal connection at 43.

Secured to the end of arm 44 is a cable 50 which passes over a transverse bolt 51 secured in housing 12 and through an opening 52 in the top wall of the housing. When cable 50 is pulled, arm 44 is pulled upwardly at its connection with said cable and is also rocked clockwise with respect to pivot 43, the spring hook 47 acting on an upwardly yieldable pivot bearing for the forward portion of said arm. A downward force is thus applied to pivot bearing 43, causing the jaws 38 and 37 to swing open, lug 49 being disengaged from notch 48 by the forward swinging of arm 44 as the hooked end of spring 45 is flexed upwardly. When cable 50 is released, spring 45 restores the jaws to their normal closed positions, as illustrated in Figure 5.

Pivotally connected to arm 28 at 53 is a lever element 54 having an angled rear end projection 55 which normally bears on the inner top corner of upper jaw 38, as shown in Figures 1 and 5. Element 54 also has an upstanding leg 56 formed with an elongated transverse bar member 57 positioned forwardly adjacent yoke 32. Said yoke is formed at its forward vertical edges with aligned notches 58, 58 adapted at times to receive the bar member 57, as will be subsequently described.

Designated at 59 is a trailer or farm implement of the wheeled type having a drawbar 60. Rigidly secured to the end of drawbar 60 is a stationary concave lower jaw member 61 and pivotally secured to said drawbar at 62 is a movable concave upper jaw member 63. Secured to the intermediate portion of lower jaw member 61 is a U-shaped bracket 64 and pivoted eccentrically at 65 between the upper end portions of the bracket arms is a clamping cam 66 having a rearwardly extending handle 67. The ball 17 is receivable between the concave jaws 61 and 63 and the upper jaw 63 may be locked in clamping position on the ball by positioning the clamping cam 66 as shown in Figure 1. Said upper jaw may be released by rotating handle 67 upwardly in a counterclockwise direction from the position thereof illustrated in Figure 1.

Sleeve member 21 is coupled to the power take-off shaft of the tractor in any suitable manner, as by an axial shaft 69 secured to said sleeve member and rotatably supported on the tractor frame 11, said shaft having a bevel gear 70 meshing with a bevel gear 71 carried by the tractor power take-off shaft. Sleeve member 21 and bevel gear 70 are therefore in constant rotation while the power take-off rotates.

In connecting the trailer or implement 59 to the tractor, the jaws 37 and 38 are first opened by pulling on cable 50 and the ball 17 is pulled out to the position shown in Figure 4, cable 50 being then released. The ball is placed between the concave jaws 61 and 63 of the implement 59 and said jaws are locked in clamping positions on the ball by means of the clamping cam 66, said cam being rotated to the position of Figure 1. The operator then steps on pedal 36 thereby pushing rod 31 and yoke 32 downwardly. By this operation the transverse bar member 57 on lever 54 enters the notches 58, 58, whereby the yoke 29 is moved upwardly, moving sleeve member 24 upwardly and engaging clutch plate 25 with the rotating clutch plate 23.

The engagement of clutch plate 25 with clutch plate 23 connects shaft 13 to sleeve member 21 causing said shaft to rotate and to wind cable 16 onto the sleeve 15. The jaws 61 and 63 being clamped over ball 17 are thus drawn into the open jaws 37 and 38 and come into abutment with the inner surfaces thereof. As the inner surfaces of jaws 37 and 38 are engaged by jaws 61 and 63, the impact is transmitted to lever 54 and causes said lever to be swung counterclockwise, withdrawing the bar member 57 from the notches 58, 58. This releases rod member 31, allowing spring 33 to restore said rod member to its normal raised position. As said rod member moves upwardly yoke 32 swings arm 28 counterclockwise, as viewed in Figure 1, retracting sleeve member 24 downwardly so that clutch plate 25 becomes disengaged from clutch plate 23. This stops the rotation of shaft 13, leaving the implement coupled to the tractor.

To uncouple, cable 50 is pulled, causing the jaws 38 and 37 to open and allowing the clamped jaws 61 and 63 to be extracted from jaws 38 and 37. By rotating handle 67 counterclockwise, as above explained, the ball 17 may then be disengaged from between the jaws 61 and 63.

One of the principal advantages of the hitch apparatus above described is to enable the operator to extricate a heavy implement such as a combine, from mud or soft soil where the tractor does not have enough traction to pull the implement. Under these conditions, the operator merely pulls the trip cable 50 and drives the tractor forwardly for the full length of cable 16. He then stops the tractor and steps on pedal 36, engaging the clutch on the hitch. This will wind up the cable 16, pulling the implement forwardly and hitching it to the tractor without requiring the operator to leave his seat. This operation is repeated until the implement has been pulled from the mud or soft soil.

While a specific embodiment of a tractor hitch apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A hitching apparatus for connecting a wheeled implement or the like to a tractor, comprising a housing secured to the rear portion of the tractor, a pair of opposing pivoted jaws in said housing, a windlass in said housing having a cable wound thereon, a ball member secured to the end of said cable, a ball clamping device carried by the drawbar of the implement, said ball clamping device fitting between said opposing jaws, a driving member rotatably mounted on said housing, and manually operable clutch means for at times connecting said driving member to said windlass.

2. A hitching apparatus for connecting a wheeled implement or the like to a tractor, comprising a housing secured to the rear portion of an opening rearwardly of the tractor, a pair of opposing concave jaws pivotally secured in said housing, means biasing said jaws to closed position, means for holding the jaws open at times, a windlass in said housing having a cable wound thereon, a ball member secured to the end of said cable, a ball clamping device carried by the drawbar of the implement, said clamping device being receivable between said opposing jaws, a driving member rotatably mounted on said housing, manually operable clutch means for at times connecting said driving member to said windlass, and means responsive to the pulling of the ball clamping device by said cable against the opposing jaws for disconnecting said driving member from the windlass.

3. A hitching apparatus for connecting a wheeled implement or the like to a tractor comprising a housing secured to the rear portion of and opening rearwardly of the tractor, a pair of opposing concave jaws pivotally secured in said housing, means biasing said jaws to closed positions, manually settable means for holding the jaws open, a windlass in said housing having a cable wound thereon, a ball member secured to the end of said cable, a ball clamping device carried at the end of the implement drawbar, said clamping device being receivable between said opposing jaws, a driving member rotatably mounted on said housing, clutch means controlled by said settable means for connecting said driving member to said windlass, and means responsive to the pulling of the ball clamping device by said cable against the opposing jaws for stripping said settable means to release the jaws and at the same time to disconnect said clutch means.

4. A hitching apparatus for connecting the drawbar of a wheeled implement or the like to a tractor, comprising a housing secured to the rear portion of the tractor and opening rearwardly thereof, a pair of opposing concave jaws pivotally secured in said housing, means biasing said jaws to closed positions, a shaft journalled in said housing, a cable wound on said shaft, a driving member rotatively carried on said shaft, a sleeve member keyed to said shaft and axially slidable thereon, said sleeve member and driving member being formed with cooperable clutch elements engageable responsive to axial movement of said sleeve member, a ball member secured to the end of said cable, a ball clamping device carried at the end of the implement drawbar, said clamping device being receivable between said opposing jaws, an arm pivoted to the housing and engaging said sleeve member, a holding member normally supporting said arm, said holding member being manually settable to a position wherein the arm is unsupported, a trip member pivoted to said arm and engageable with said holding member to maintain it in said position, said trip member also engaging the inner end portion of one of the jaws and acting to maintain the jaw open when said holding member is set in said position, said trip member being releasable responsive to the impact of said ball clamping device against said jaw when it is pulled into the housing, and means biasing said holding member to a position wherein it supports said arm, the arm acting to move the sleeve member into engagement with the driving member when the arm is unsupported by said holding member.

RALPH R. WYMORE.

No references cited.